(12) United States Patent
Tosato et al.

(10) Patent No.: US 9,784,209 B2
(45) Date of Patent: Oct. 10, 2017

(54) CYLINDER HEAD FOR INTERNAL-COMBUSTION ENGINE WITH INTAKE DUCTS HAVING AN AIR-DEFLECTING PROJECTION

(71) Applicants: Fiat Group Automobiles S.p.A., Turin (IT); FPT Motorenforschung AG, Arbon (CH)

(72) Inventors: Luca Tosato, Turin (IT); Flavio Personeni, Arbon (CH)

(73) Assignees: FIAT GROUP AUTOMOBILES S.P.A., Turin (IT); FPT MOTORENFORSCHUNG AG, Arbon (CH)

(*) Notice: Subject to any disclaimer, the term of this patent is extended or adjusted under 35 U.S.C. 154(b) by 135 days.

(21) Appl. No.: 14/246,664

(22) Filed: Apr. 7, 2014

(65) Prior Publication Data

US 2014/0305403 A1    Oct. 16, 2014

(30) Foreign Application Priority Data

Apr. 5, 2013  (EP) .................................... 13162582

(51) Int. Cl.
*F02F 1/42* (2006.01)
*F02B 31/04* (2006.01)
(Continued)

(52) U.S. Cl.
CPC ............... *F02F 1/425* (2013.01); *F01L 3/06* (2013.01); *F02B 31/04* (2013.01); *F02F 1/4235* (2013.01);
(Continued)

(58) Field of Classification Search
CPC .... F02F 1/4235; F02F 1/425; F02F 2001/247; F01L 3/00; F01L 3/06; F01L 3/20
(Continued)

(56) References Cited

U.S. PATENT DOCUMENTS 3,273,551 A    9/1966  Julien et al.
4,159,011 A *  6/1979  Sperry ....................... 123/193.5
(Continued)

FOREIGN PATENT DOCUMENTS

GB    1290019        9/1972
GB    2043779 A     10/1980

OTHER PUBLICATIONS

European Search Report for corresponding European Application No. 13162582.4, dated Jul. 13, 2013 completed Jul. 16, 2013.

*Primary Examiner* — Kevin A Lathers
(74) *Attorney, Agent, or Firm* — Heslin Rothenberg Farley & Mesiti P.C.; Victor A. Cardona, Esq.

(57) ABSTRACT

A cylinder head for an internal-combustion engine includes, for each cylinder of the engine, at least one intake duct extending from an inlet located at a lateral face of the head down to an outlet cylindrical mouth and an intake valve associated with each intake duct. The surface of the intake duct has a longitudinal projection for deflecting the flow of air that flows through the intake duct. The projection is configured to provide a deflection of the air flow towards the two sides of the valve stem, so as to substantially reduce the quantity of air that hits the valve stem directly. The projection extends down to the outlet cylindrical mouth, so as to hinder a flow of air through an angular sector of the cross-sectional area of the outlet mouth which angular sector faces towards the lateral face of the cylinder head.

6 Claims, 4 Drawing Sheets

(51) Int. Cl.
*F01L 3/06* (2006.01)
*F02F 1/24* (2006.01)

(52) U.S. Cl.
CPC ....... *F02F 2001/247* (2013.01); *Y02T 10/146* (2013.01)

(58) Field of Classification Search
USPC .......................................................... 123/306
See application file for complete search history.

(56) References Cited

U.S. PATENT DOCUMENTS

| | | | | |
|---|---|---|---|---|
| 4,478,182 | A * | 10/1984 | Nakanishi et al. | 123/188.14 |
| 4,503,819 | A * | 3/1985 | Okumura | F02B 31/082 |
| | | | | 123/188.14 |
| 5,081,965 | A * | 1/1992 | Walters et al. | 123/188.3 |
| 5,816,210 | A * | 10/1998 | Yamaguchi | F02F 1/4264 |
| | | | | 123/188.14 |
| 2008/0230019 | A1 * | 9/2008 | Moore | F01L 1/053 |
| | | | | 123/90.1 |

\* cited by examiner

CYLINDER HEAD FOR INTERNAL-COMBUSTION ENGINE WITH INTAKE DUCTS HAVING AN AIR-DEFLECTING PROJECTION

CROSS REFERENCE TO RELATED APPLICATIONS

This application claims priority from European patent application No. 13162582.4, filed on Apr. 5, 2013, the entire disclosure of which is incorporated herein by reference.

The present invention relates to a cylinder head for an internal-combustion engine, of the type comprising, for each cylinder of the engine:
- at least one intake duct defined by a cavity extending through the body of the head starting from an inlet located at a lateral face of the head down to an outlet cylindrical mouth opening out on a bottom face of the head,
- an intake valve associated with each intake duct and including a valve stem and a valve head cooperating with a valve seat defined at said outlet cylindrical mouth, said cylindrical mouth being coaxial with said valve stem,
- wherein the surface of said intake duct has a projection which is longitudinally elongated in a direction substantially parallel to the axis of the duct, for deflecting the flow of air that flows through the intake duct, thus creating a desired field of motion of the flow of air in the cylinder of the engine,
- wherein said air-deflecting projection is formed on the side of the surface of the intake duct that is closer to the bottom face of the cylinder head,
- wherein said air-deflecting projection has a plane of symmetry containing the axis of the valve stem and has a first end facing towards the inlet of the intake duct and a second end facing towards the outlet mouth of said intake duct.

A cylinder head of the type referred to above is, for example, described and illustrated in document U.S. Pat. No. 4,159,011. However in this known solution the air-deflecting projection is located at a position spaced apart from the outlet mouth of the intake duct, so as to form a low pressure area on the surface downstream of the projection, which keeps the air flow adherent to this surface. Document U.S. Pat. No. 3,273,551 discloses a projection which is closer to the outlet mouth, but is configured with a curved profile which again has the purpose of guiding the air flow and keeping it adherent thereto. The object of the present invention is that of providing a cylinder head of the above described type which improves the characteristics of the flow of air entering into the cylinder of the engine both from the standpoint of the quantity of air which is introduced into the cylinder and form the standpoint of an optimum motion of the air within the cylinder, in such a way as to increase significantly the efficiency of combustion.

With a view to achieving the above object, the subject of the invention is a cylinder head for an internal-combustion engine having all the characteristics that have been mentioned at the beginning of the present description and further characterized in that:
- said air-deflecting projection is configured to provide a deflection of the air flow towards the two sides of the valve stem, so as to reduce the quantity of air that hits the valve stem directly, and
- said air-deflecting projection extends to said outlet cylindrical mouth and is configured in such a way that said air-deflecting projection hinders a flow of air through an angular sector of the cross-sectional area of said outlet mouth which faces towards said lateral face of the cylinder head.

Thanks to the aforesaid characteristics, the air-deflecting projection according to the invention provides an increase in the quantity of air that enters into the cylinder, a reduction, if not a total elimination, of perturbations in the air flow due to a direct interference of the air flow with the valve stem, and an increase of the charge motion of the air within the cylinder, due to that most part of the air flow entering into the cylinder proceeds along the direction deriving form the orientation of the intake duct with respect to the cylinder (which orientation is selected in order to impart a desired charge motion to the air flow within the cylinder).

According to a further preferred characteristic of the present invention, in order to reduce the aforesaid reduction of the quantity, of air which hits the valve stem directly, the ratio between the width of the cross-section of said air-deflecting projection and the diameter of the valve stem is between 0.8 and 1.2, so that the valve stem lies in the shadow of the air-deflecting projection with respect to the air flow through the intake duct.

Also preferably, at said second end thereof the air-deflecting projection has a front face arranged substantially flush with, and along an extension of, a portion of the surface of the outlet cylindrical mouth, so as to further reduce the flow of air through said angular sector of the cross-sectional area of the outlet mouth. In the practical embodiment, and according to a conventional technique, the surface of the outlet mouth is defined by the inner surface of a ring secured within a cavity of the bottom surface of the cylinder head.

The cylinder head of the invention has been developed in particular for a Diesel engine, but its application to a gasoline engine is also not excluded Further characteristics and advantages of the invention will emerge from the ensuing description with reference to the annexed drawings, which are provided purely by way of non-limiting example and in which.

Figure 3:
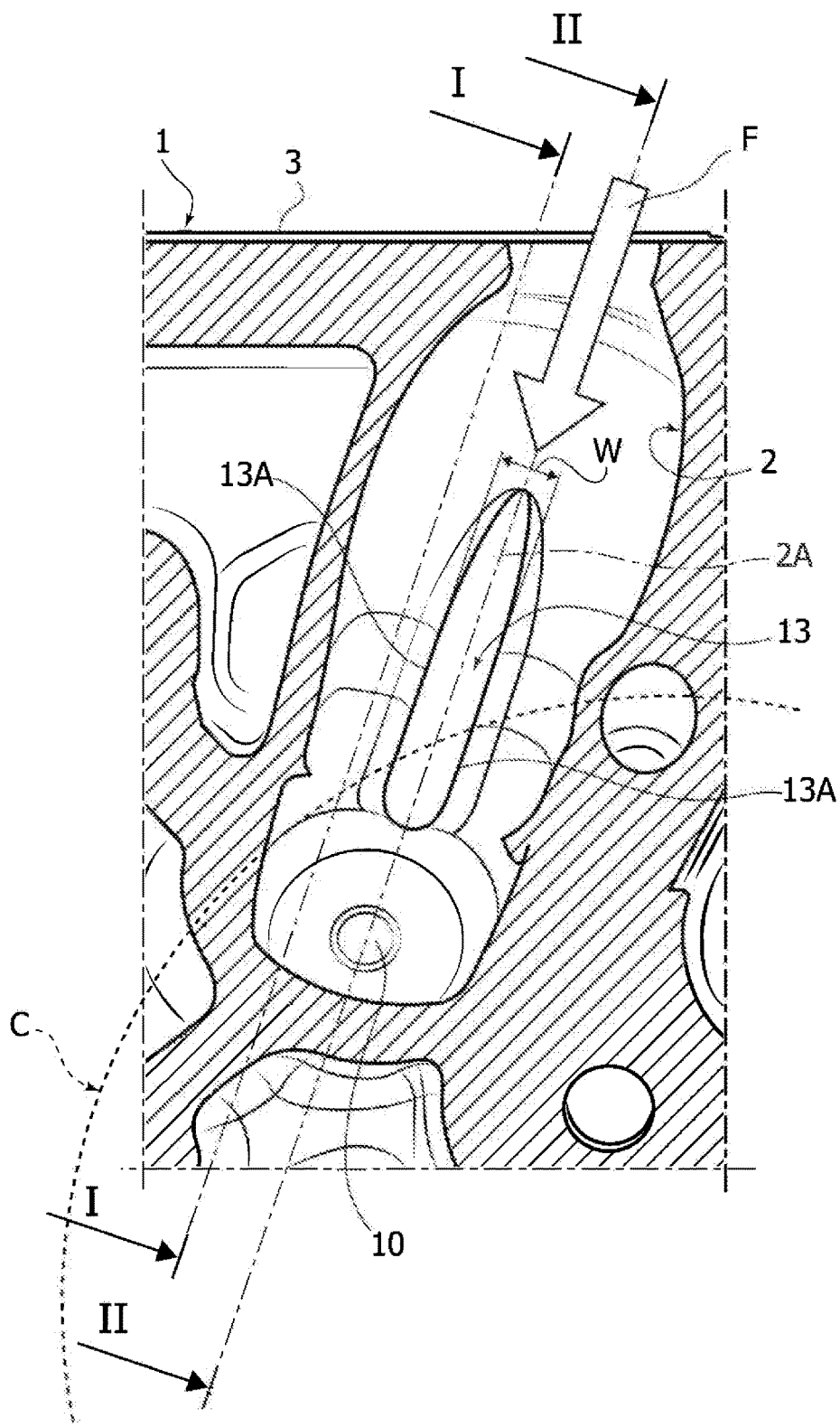
FIG. 3 is a cross-sectional view according to line III-III of FIG. 2.

In the drawings, reference number 1 designates the metal body of a cylinder head of an internal-combustion engine, which in the specific illustrated example is a Diesel engine. As indicated, the invention is however applicable also to gasoline engines The drawings show only a portion of the cylinder head, in which an intake duct 2 is provided, associated to one of the cylinders of the engine. The intake duct 2 is defined by a cavity formed within head 1. This cavity extends from a lateral face 3 of the head 1 to which the intake manifold of the engine (not illustrated) is to be associated. The cavity defining the duct 2 extends to an outlet cylindrical mouth 5 opening out onto the bottom face 4 of the head, which is to be mounted on the engine block (not illustrated), where the engine cylinders are formed (the profile C of a cylinder to which the intake duct 2 is associated is illustrated in FIG. 3). As shown, in the illustrated example said intake duct has a substantially tangential orientation with respect to the associated cylinder, so as to impart a swirl motion to the air introduced into the cylinder.

However, the invention is also applicable to intake ducts of a gasoline engine, where the ducts are configured to favour a tumble motion.

With intake duct 2 there is associated an intake valve 8 having a head 9 and a stem 10 slidably mounted within a guide 11 (FIG. 2) fixed within a cavity 12 of the head 1. The outlet mouth 5 has a cylindrical surface coaxial with the valve stem 10. In the illustrated practical embodiment the outlet mouth 5 is defined by the inner surface of a ring 6 secured within a cavity formed in the bottom surface of the cylinder head, this ring defining a valve seat 7 cooperating with the head 9 of valve 8. The details regarding the system for controlling the valve 8 are not illustrated herein in so far as this control system may be of any type and does not fall, taken in itself, within the scope of the present invention.

The surface of the cavity defining the intake duct 2 has, on its side closer to the bottom surface 4 of the cylinder head 1, an air-deflecting projection 13, longitudinally elongated in a direction substantially parallel to axis 2A of the intake duct 2, this projection being configured for deflecting the air flow through the intake duct so as to provide a desired motion of the air flow within the engine cylinder.

Projection 13 has a plane of symmetry containing the axis of the valve stem 10 (FIG. 3) and has a first end facing towards the inlet of the intake duct and a second end facing towards the outlet mouth 5 of the intake duct 2.

Moreover, projection 13 is configured for providing a deflection of the air flow to both sides of the valve stem 10, so as to dramatically reduce the quantity of air that hits the valve stem 10 directly.

Preferably, in order to achieve the best result from this standpoint, the width W (FIG. 3) of the cross-section of said air-deflecting projection 13 is selected between 0.8 and 1.2 times the diameter of the valve stem 10, so that the valve stem lies in the "shadow" of the air-deflecting projection 13 with respect to the air flow through the intake duct 2.

Figure 4:
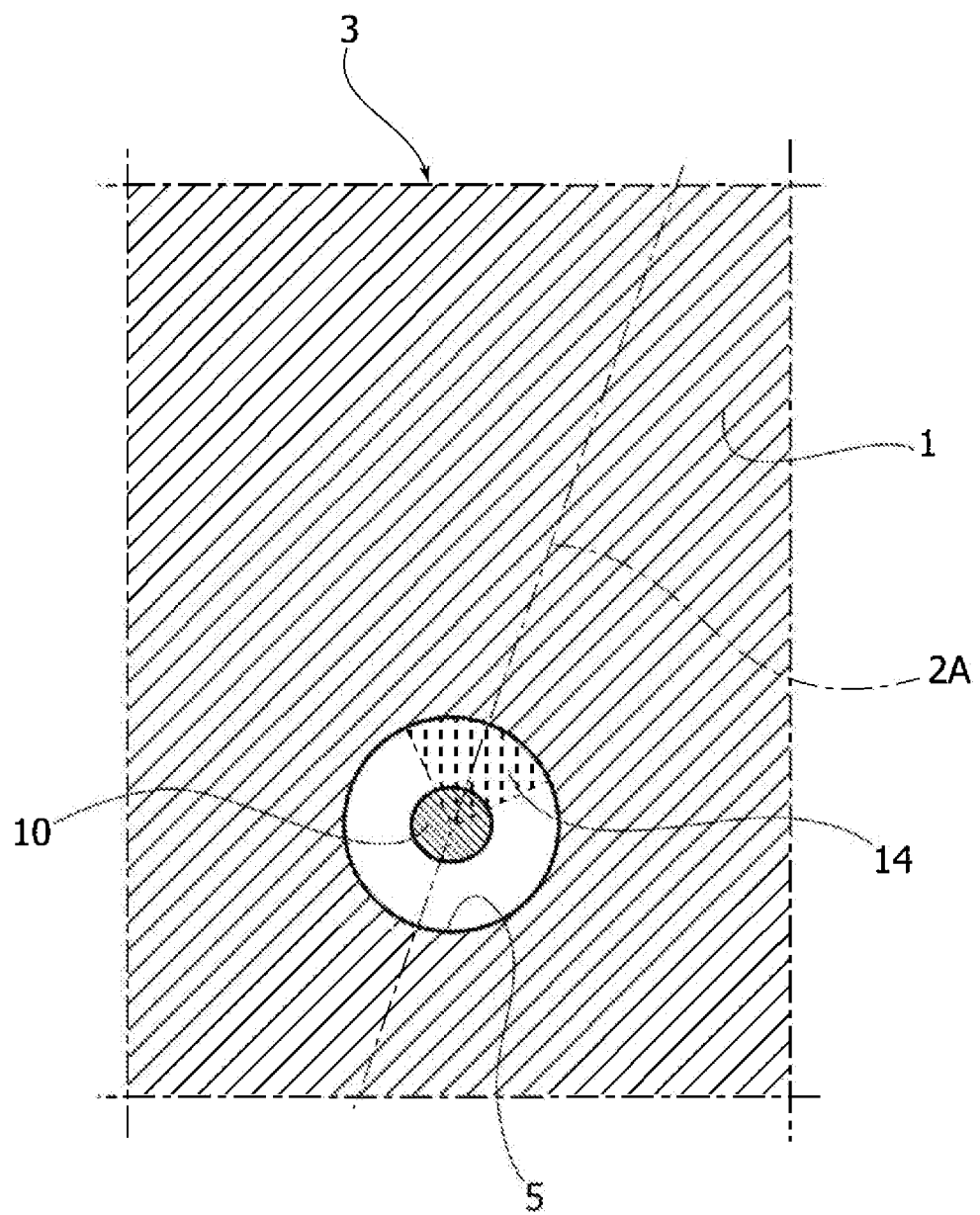
FIG. 4 is a cross-sectional view along line IV-IV of FIG. 2.

According to a further important feature of the present invention, the air-deflecting projection 13 extends to said outlet cylindrical mouth 5, so that said air-deflecting projection hinders the flow of air through an angular sector 14 of the cross-sectional area of said outlet mouth 5, the sector 14 facing towards said lateral surface 3 of the cylinder head. The angular sector 14 (see FIG. 4) is defined as a 90° sector of the cross-sectional area of the outlet mouth 5 which faces towards the lateral surface 3 (see FIG. 4) and is arranged symmetrically with respect to the aforesaid plane of symmetry of the projection 13 (FIG. 3).

Figure 2:
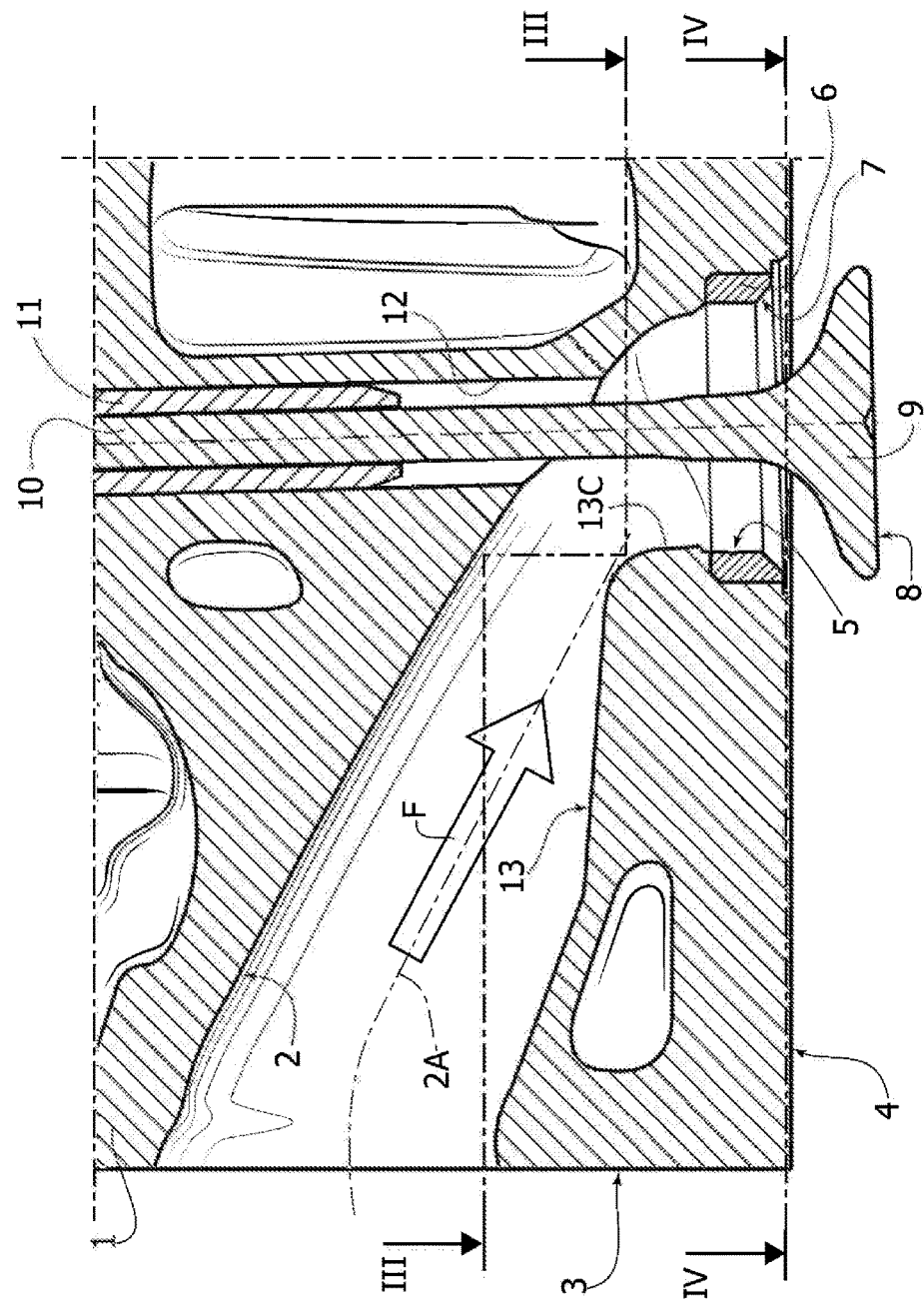
FIG. 2 is a partial cross-sectional view of the cylinder head of FIG. 1, according to line II-II of FIG. 3.

Reduction to a minimum of the quantity of air flowing through sector 14, in passing from the intake duct 2 to the engine cylinder, ensures that most part of the air flow enters into the cylinder passing through the remaining part of the cross-sectional area of the outlet mouth 5, proceeding along the direction of arrow F in FIG. 2. This provides best results from the standpoint of quantity of air entering into the cylinder and charge motion.

Figure 1:
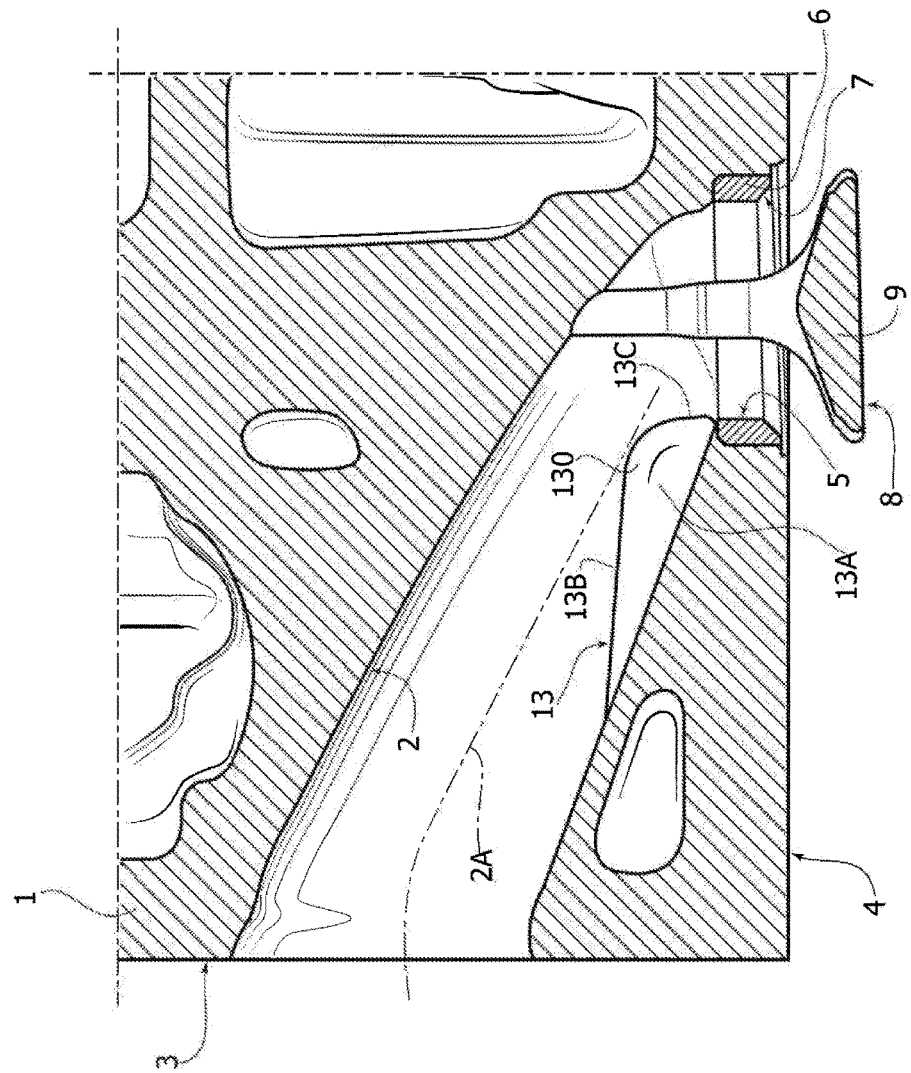
FIG. 1 is a partial cross-sectional view, according to line I-I of FIG. 3 of a preferred embodiment of a cylinder head according to the invention.

In the preferred embodiment, at its end facing towards mouth 5, the air-deflecting projection 13 has a front face 13C which is arranged substantially flush with, and along the extension of, a portion of the surface of the cylindrical mouth 5 (see FIGS. 1-3), so that the profile of this front face 13C defines an upward extension (with reference to the drawings) of the profile of the surface of the outlet mouth 5. In this manner, the quantity of air flowing through the angular sector 14 of the cross-sectional area of the outlet mouth 5 (FIG. 4) is reduced to a minimum.

The dimensions and shape of the deflecting projection 13 may vary widely according to the requirements of each specific application. The annexed drawings show by way of example a preferred embodiment in which the deflecting projection 13 has a height increasing progressively from its opposite ends towards an area 130, intermediate between the ends, where the deflecting projection 13 defines a restricted section for passage of the air.

In the case of the example illustrated, the deflecting projection 13 has two lateral surfaces 13A (FIGS. 1 and 3), and a top surface including an inclined surface portion 13B that extends from the end of the projection 13 facing towards the lateral face 3 of the head (where the projection has zero height) as far as the intermediate area 130, where the projection 13 has a maximum height. The top surface of the projection 13 extends forwardly into the aforesaid front face 13C arranged flush with and along an extension of a portion of the surface of the cylindrical mouth 5.

Preferably, the maximum height of the deflecting projection 13 is smaller than or equal to half of the diameter of the head 9 of valve 8.

Naturally, without prejudice to the principle of the invention the details of construction and the embodiments may vary widely with respect to what is described and illustrated herein purely by way of example, without thereby departing from the scope of the present invention. In particular, as already mentioned above, the shape and dimensions of the projection 13 may vary widely with respect to the example illustrated according to the requirements of the specific applications.

The invention claimed is:

1. A cylinder head for an internal-combustion engine, comprising, for each cylinder of the engine:
    at least one intake duct defined by a cavity extending through a body of the head starting from an inlet located at a lateral face of the head down to an outlet cylindrical mouth opening out on a bottom face of the head,
    an intake valve associated with each intake duct and including a valve stem and a valve head cooperating with a valve seat defined at said outlet cylindrical mouth, said cylindrical mouth being coaxial with said valve stem,
    wherein a surface of said intake duct has a projection which is longitudinally elongated in a direction substantially parallel to an axis of the intake duct, for deflecting the flow of air that flows through the intake duct, thus creating a desired field of motion of an air flow in the cylinder of the engine,
    wherein said air-deflecting projection is formed on a bottom side of the surface of the intake duct that is closer to the bottom face of the cylinder head, said projection comprising a top side located furthest from said bottom side,
    wherein said air-deflecting projection has a plane of symmetry containing an axis of the valve stem and has a first end facing towards the inlet of the intake duct and a second end facing towards the outlet mouth of said intake duct,
    wherein said second end of the air-deflecting projection has a front face arranged substantially flush with, and along an extension of, a portion of the surface of the outlet cylindrical mouth,
    wherein a ratio between a width of said top side of said air-deflecting projection in a direction perpendicular to the axis of the intake duct and a diameter of said valve stem is between 0.8 and 1.2, so that the valve stem lies in a shadow of the air-deflecting projection with respect to the air flow through the intake duct, wherein said surface of the outlet mouth is defined by the inner surface of a ring secured within a cavity of the bottom surface of the cylinder head, wherein a maximum height of the air-deflecting projection is smaller than or equal to half of the diameter of the head of the intake valve associated to said intake duct, said air-deflecting projection configured to provide a deflection of the air flow towards the two sides of the valve stem, so as to reduce the quantity of air that hits the valve stem directly, and said air-deflecting projection extending down to said outlet cylindrical mouth and configured in such a way that said air-deflecting projection hinders a flow of air through an angular sector of the cross-sectional area of said outlet mouth which angular sector faces towards said lateral face of the cylinder head.

2. The cylinder head according to claim 1, wherein said air-deflecting projection has a height increasing progressively from opposite ends thereof towards an intermediate area between said ends.

3. The cylinder head according to claim 2, wherein said deflecting projection comprises two lateral surfaces and a top surface with a cross-section having a rounded profile, including:
  a first inclined surface portion between the first end of the deflecting projection and the aforesaid area of maximum height, and
  a second surface portion defining said front face located flush with, and along an extension of, a portion of the surface of the outlet mouth.

4. The cylinder head according to claim 1, wherein said second end of the air-deflecting projection has a front face arranged substantially flush with, and along an extension of, a portion of the surface of the outlet cylindrical mouth.

5. The cylinder head according to claim 1 wherein said width of said projection increases progressively from a first end of said projection closest to said inlet to an intermediate portion between said inlet and a second end of said projection closest to said outlet.

6. The cylinder head according to claim 5 wherein said intermediate portion has a maximum height of said projection.

* * * * *